(12) United States Patent
Luechinger et al.

(10) Patent No.: US 7,227,088 B2
(45) Date of Patent: Jun. 5, 2007

(54) BALANCE WITH A DRAFT SHIELD

(75) Inventors: Paul Luechinger, Uster (CH); Marc Zehnder, Gutenswil (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 11/378,469

(22) Filed: Mar. 20, 2006

(65) Prior Publication Data
US 2006/0231298 A1   Oct. 19, 2006

(30) Foreign Application Priority Data
Apr. 19, 2005   (EP) .................................. 05103138

(51) Int. Cl.
*G01G 21/28*   (2006.01)
(52) U.S. Cl. .................... 177/180; 312/138.1; 312/283
(58) Field of Classification Search ............... 177/180, 177/181, 238; 312/138.1, 283
See application file for complete search history.

(56) References Cited

U.S. PATENT DOCUMENTS

| | | | |
|---|---|---|---|
| 4,664,207 A * | 5/1987 | Knothe et al. .............. | 177/181 |
| 4,798,250 A * | 1/1989 | Knothe et al. .............. | 177/181 |
| 5,209,082 A * | 5/1993 | Ha ............................. | 62/265 |
| 6,420,666 B1 | 7/2002 | Baumeler et al. | |
| 6,557,391 B2 | 5/2003 | Luechinger | |
| 6,603,081 B2 | 8/2003 | Luechinger | |
| 6,637,464 B1 * | 10/2003 | Cornwall ..................... | 138/90 |

FOREIGN PATENT DOCUMENTS

DE   85 07 282 U1   4/1987
DE   87 16 977 U1   9/1988

OTHER PUBLICATIONS

*European Search Report dated Aug. 15, 2005 (with English translation of category of cited documents).

* cited by examiner

*Primary Examiner*—Randy W. Gibson
(74) *Attorney, Agent, or Firm*—Buchanan Ingersoll & Rooney PC

(57) ABSTRACT

A balance is equipped with a draft shield that surrounds a weighing compartment and has at least one sidewall which can be designed to be slidable to allow the draft shield to be opened and closed. An access opening is provided in the sidewall, and a closure element serves to close off the access opening. The size and position of the access opening in the sidewall can be varied by means of the closure element.

21 Claims, 4 Drawing Sheets

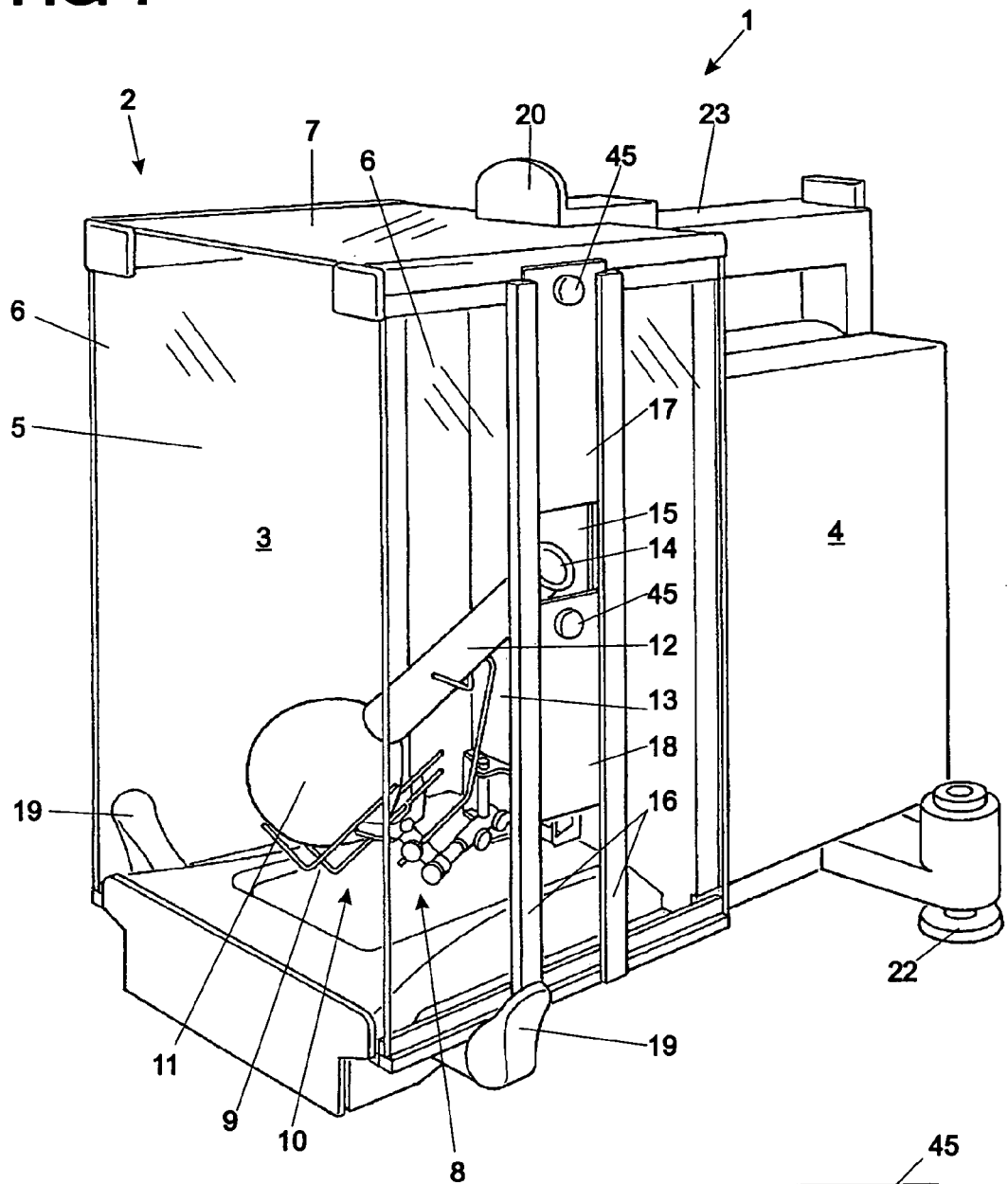
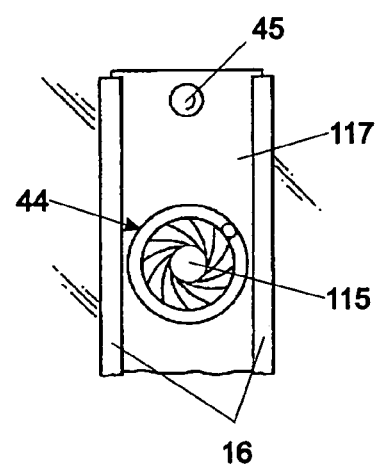

BALANCE WITH A DRAFT SHIELD

FIELD

A balance is disclosed with a draft shield which surrounds a weighing compartment and has at least one lateral wall designed to be slidable for opening and closing the draft shield.

BACKGROUND INFORMATION

Balances of this kind are used in the laboratory where, as a frequent occurrence, substances are filled into a container that is placed on a weighing pan or on a weighing object carrier of a balance. In the laboratory, filling containers with materials to be weighed is done mostly by hand. Pulverous or liquid weighing material is taken out of a supply container by a spatula or a spoon and—with the draft shield of the balance opened up—delivered into a weighing receptacle which rests on the weighing object carrier with the opening of the receptacle facing upwards. This involves the risk that weighing material is spilled on its way to the weighing receptacle, that it falls on the weighing object carrier and is inadvertently included in the weighing. Furthermore, the hand of the user enters into the weighing compartment and causes a warming of the air surrounding the weighing receptacle. Added to this is the problem of the air draft when at least one wall panel of the draft shield is completely opened in order to allow access to the weighing receptacle. Taking a substance to be dispensed out of a supply container that is placed outside of the weighing compartment can involve a time-consuming manipulation as it often involves multiple passes through an opened wall panel of a draft shield with which a balance is normally equipped. This leads to further air movements which can disturb the thermal equilibrium in the weighing compartment. Experience shows that after the weighing receptacle has been filled and the draft shield has been closed, it will take some time until the atmospheric conditions around the weighing receptacle are stabilized and a reliable weighing result can be obtained in the subsequent weighing of the substance that has been filled into the receptacle.

In laboratories of the pharmaceutical and chemical industries, the weighing of the smallest amounts, primarily in the form of pulverous substances, is of increasing importance. The substances are often expensive or even toxic. In applications that are subject to regulations and where error tolerances have to be strictly complied with, the ability to reliably measure even the smallest sample quantities is of the highest order of importance. As a result, the time required to reach stable weighing conditions after the filling process can thus easily extend beyond a few seconds and take several minutes, which runs counter to an efficient work flow.

As an alternative, the receptacle could also be filled outside of the balance. For this purpose, the weighing material is weighed on a weighing paper or in a weighing boat and subsequently transferred to the receptacle. This procedure is less desirable as the user cannot be certain of having transferred all of the substance, so that it could again turn out to be better to perform the filling directly into a weighing receptacle that is set in place on the weighing pan inside the weighing compartment.

A balance which is described in U.S. Pat. No. 6,603,081 B2 has a weighing compartment, a balance housing containing the weighing cell and forming the rear wall and the floor of the weighing compartment, and a carrier device which serves to receive the weighing object and is attached to a cantilevered extension of the weighing cell. A fixed holder system is attached to the rear wall of the weighing compartment, which allows weighing compartment accessories to be fastened at different heights above the floor of the weighing compartment. A holder for laboratory devices or an intermediate floor can be attached to the holder system, where the intermediate floor can be useful as a place on which to set substance containers, tools, etc. The supply container for the substance to be filled into a receptacle can now be placed inside the weighing compartment, e.g., on the intermediate floor. However, the spatial situation inside the weighing compartment can involve especially careful hand movements so as to avoid knocking over the supply container that has been put on the intermediate floor. Furthermore, the air in the weighing compartment can still warm up too much if the hand of the user dwells in the weighing compartment too long.

A further unsolved problem concerns the flexibility of a balance and the conditions that the balance imposes on the weighing receptacles that the weighing substance is filled into. The analyses or reactions that follow after the weighing process involve the broadest diversity of weighing receptacles of different sizes, such as a long-necked measuring flask, an Erlenmeyer flask, or test tubes.

In a balance which is described in DE 87 16 977 U1, the problem of avoiding internal air currents inside a closed draft shield is addressed by keeping the height of the draft shield as low as possible and choosing a design where in the case of taller weighing receptacles the height of the draft shield can be expanded in such a way that an accessory enclosure top can be placed on the topside of the draft shield and secured by engaging the guide tracks of the top panel. A special version of this accessory enclosure top has a closable access opening at the topside to allow the filling of a measuring flask standing on the weighing pan.

It has been found to be a drawback, particularly when filling pulverous substances into a narrow-necked weighing receptacle placed on a balance according to DE 87 16 977 U1, that the filling from above is extremely undesirable from an ergonomics point of view and therefore creates the risk that the substance may get spilled.

SUMMARY

A balance is disclosed whereby in the filling of substances, particularly powders, into a weighing receptacle placed on the weighing object carrier, the time period for the ambient conditions around the weighing receptacle to become stable is minimized. A method of filling the weighing receptacle that meets desired ergonomic requirements is also disclosed.

An exemplary balance is equipped with a draft shield that surrounds a weighing compartment and has at least one sidewall that can be slidable to allow the draft shield to be opened and closed. An access opening can be included in the sidewall, with a closure element serving to close off the access opening. In this arrangement, the size and/or position of the access opening in the sidewall can be varied by means of the closure element.

As a result, the flow of air currents into or out of the weighing compartment during the filling of a weighing receptacle can be largely avoided and stable weighing conditions can be achieved rapidly after the filling when the access opening has been closed by means of the closure element. Consequently, the assurance of the measurement is significantly enhanced, particularly in cases where the substance quantities being weighed are small. It is advantageous to work with small substance quantities insofar as, for example in the preparation of solutions, only the required amount of solution is prepared and no waste occurs. However, this requires the precise and error-free weighing of small substance quantities.

The access opening in the sidewall is kept only as large as is absolutely necessary for filling the substance into the opening of the weighing receptacle. In this arrangement, the opening of the weighing receptacle can be located as close to the access opening as possible. The longitudinal axis of the weighing receptacle can be tilted relative to the vertical, i.e., relative to the direction of the gravity force. During the filling process, the weighing receptacle is inside the almost totally closed draft shield.

The closure element can be arranged on the outside of the sidewall. Thus, if the sidewall is a movable panel of the draft shield, the panel can be moved to open and close the weighing compartment, without the closure element interfering with the movement of the wall.

The arrangement includes a device for supporting an elongated weighing receptacle near its fill opening. The device can be configured as a holder arm that is fastened to the weighing pan support.

The balance in an advantageous embodiment includes a coupling arrangement that reaches through passage openings in the rear wall of the weighing compartment. A weighing object carrier is removably attached to the coupling arrangement, so that one weighing object carrier can be exchanged for another without a problem, whereby the flexibility of the balance can be massively increased.

In a particularly advantageous further developed embodiment the weighing object carrier is equipped with a weighing object receiver setup as well as a position-adjusting device. The weighing object receiver setup is likewise exchangeable and is designed to allow translatory movement inside the weighing compartment relative to the position of the coupling arrangement by means of the position-adjusting device of the weighing object carrier and fixation of the weighing object receiver setup in the moved position. In particular the orientation and the location of the weighing object receiver setup in relation to the coupling arrangement are adjustable through a translatory displacement and a rotation by means of the position-adjusting device of the weighing object carrier. In a special configuration the weighing object receiver setup is configured as a grate with angled-off grate bars.

A weighing object receiver setup of this configuration can be tilted so that a weighing receptacle with a fill opening can be placed on the weighing object receiver setup of the weighing object carrier in such a way that the weighing receptacle is inclined at an oblique angle relative to the vertical direction and that the fill opening of the receptacle is located immediately next to the access opening, but without touching the sidewall. Thus, when the closure element is open, there is a direct access through the access opening to the fill opening of the weighing receptacle.

With this arrangement, the hand of the user does not enter into the weighing compartment, and consequently the weighing compartment temperature cannot warm up during the filling of a weighing receptacle that is sitting on the weighing object carrier. As a result, stable weighing conditions are reached rapidly. Furthermore, the spilling of the substance to be weighed is prevented by the oblique position of the weighing receptacle which is particularly favorable with regard to ergonomics as well as by the short distance from a hand-held supply container to the fill opening of the weighing receptacle.

With the flexibility offered by the closable access opening on the one hand and the adjustable positioning of the weighing object receiver setup on the other, it is possible to freely select the tilt angle of the weighing receptacle from a substantially horizontal position to a nearly vertical orientation. Thus, the arrangement for the filling of a weighing receptacle placed on the weighing object carrier of a balance can be adapted to the flow characteristics of a powder to be filled into the receptacle.

In a particularly favorable embodiment of the balance, the closure element has two slides that are moveable one-dimensionally in a pair of guide tracks. As an alternative, the closure element has an iris shutter arranged on a sliding panel that is movable one-dimensionally in a pair of guide tracks, wherein the sliding panel has an opening in the area of the iris shutter. The pair of guide tracks is arranged on the outside of the sidewall. A sidewall of this type can be taken off from the balance and exchanged for another sidewall, so that balances already in possession of a customer can be retrofitted with an access opening and a closure element in the draft shield.

BRIEF DESCRIPTION OF THE DRAWINGS

The drawings illustrate the invention through exemplary embodiments, wherein:

FIG. 1 shows an exemplary balance in perspective as seen at an angle from the front with a measuring flask in place on the weighing pan carrier;

FIG. 5 shows an alternative embodiment of a closure element.

DETAILED DESCRIPTION

Figure 2:
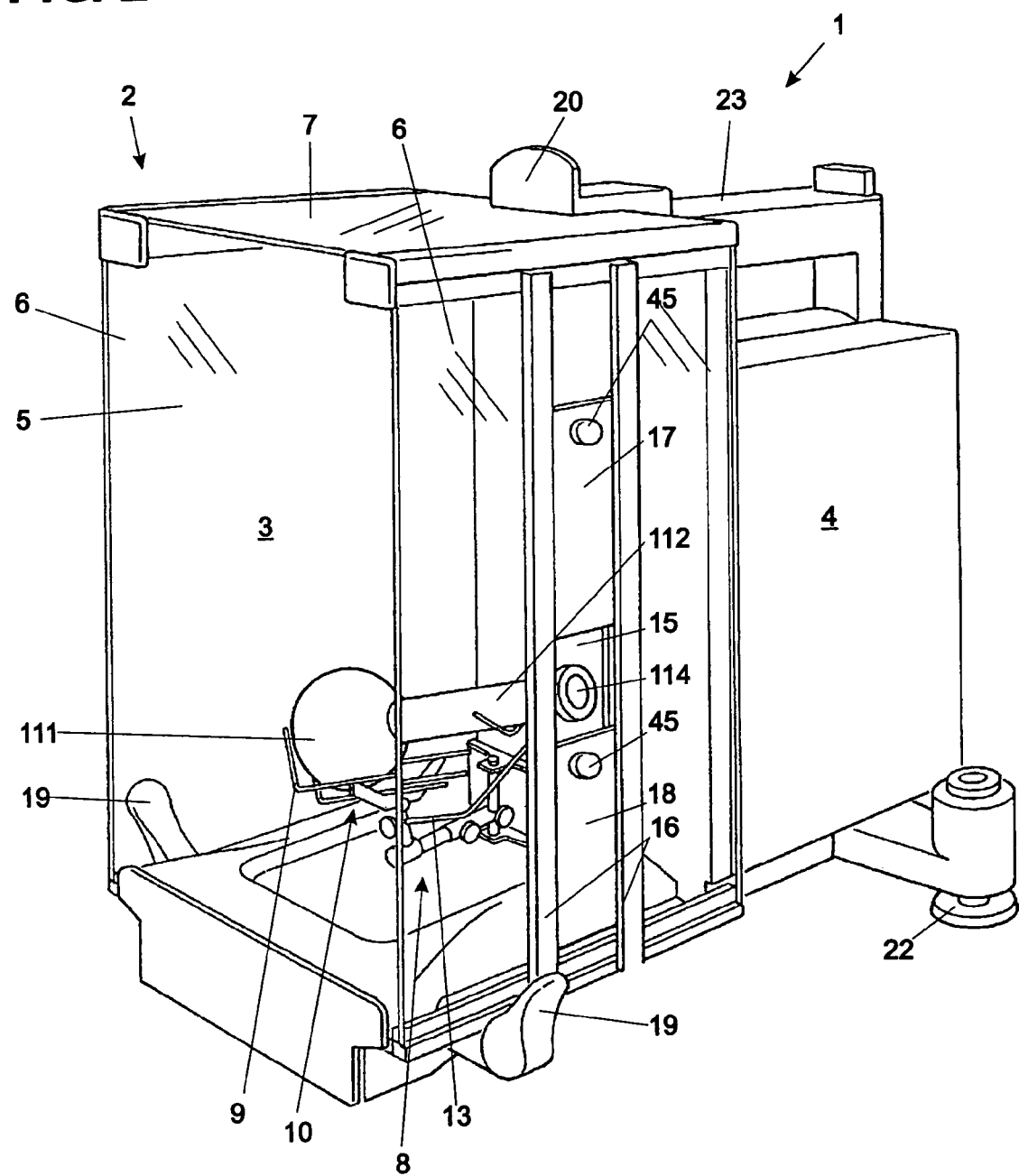
FIG. 2 shows the exemplary balance in perspective as seen at an angle from the front with another measuring flask in place on the weighing pan carrier.

FIG. 1 shows a three-dimensional representation of An exemplary balance 1 at an angle from the front. In this context, "from the front" relates to the perspective of a user who, when working with the balance 1, has the weighing compartment 3 enclosed by the draft shield 2 facing towards him, while the balance housing 4 which is facing away from the user is referred to as being arranged "to the rear" or "behind" the weighing compartment 3. An indicating—and operating unit is often arranged at the front of the balance 1 but has been omitted in FIG. 1 for clarity. The balance 1 stands on three feet 22, only one of which is visible in FIG. 1. A handle 23 can be used to lift up the balance 1 from the surface underneath, for example to clean the area under the balance.

The draft shield in this case has a front wall 5 and two sidewalls 6 as well as a top wall panel 7. These walls consist primarily of glass or a transparent plastic. The front wall 5 is arranged in a fixed position, while the sidewalls 6 and the top wall panel 7 can be slid to the rear either by hand or driven by a motor, in order to open the weighing compartment 3. The sidewall panel 6 and/or top wall panel 7 that has been opened covers the surface of the balance housing 4. The grip handles 19 and 20 serve to push the movable wall panels 6 and 7.

Inside the weighing compartment 3 a weighing object carrier is connected by means of a coupling arrangement (see FIGS. 3 to 5) to a cantilevered extension of the weighing cell which is arranged inside the balance housing 4. The weighing object carrier 8 has a position-adjusting device with different position-adjusting elements that serve to position the weighing object receiver setup 10 which in FIG. 1 is configured as a grate with grate bars 9 that are angled off at 90°. The detailed description of the weighing object carrier 2 follows hereinafter in the context of FIG. 4.

The measuring flask 11 that is resting on the weighing object receiver setup 10 is held at an acute angle relative to the vertical, i.e. the direction of gravity. Its long neck 12 rests on a holder device that is attached to the weighing object carrier 8 and has the form of a holder arm 13. The relatively narrow opening 14 of the measuring flask 11 is located close to an access opening 15 in the sidewall 6. The access opening can be opened and closed by means of two slides 17, 18 constrained with one-dimensional mobility by a pair of guide tracks 16, whereby a closure element is formed. The opening and closing of the access opening 15 by means of the slides 17, 18 takes place by means of the slide handles 45, whereby the size of the access opening 15 can be varied according to the opening 14 of the measuring flask 11. The slides 17, 18 can be made of metal or of glass. The slides 17, 18 are guided in the pair of guide tracks 16 by means of spring-tensioned brackets (not shown) in such a way that they remain stable in the position into which they have been set. This allows a user to dispense weighing substance into the measuring flask 11 without opening the sidewall. Furthermore, the position of the access opening 15 can be height-adjusted along the pair of guide tracks 16 relative to the bottom edge of the sidewall 6.

FIG. 2—in a representation that is analogous to FIG. 1—illustrates that the arrangement where the sidewall 6 of the balance 1 has an access opening 15 that can be opened and closed by means of a closure element is suitable for the filling of measuring flasks 111 or other weighing receptacles such as test tubes, Erlenmeyer flasks, etc. A small measuring flask 111 is resting in an almost horizontal position on the weighing object receiver setup 10 of the weighing object carrier 8 and is supported by the holder device 13. From an ergonomics point of view, positioning the measuring flask in this way is extremely favorable for delivering a weighing material, for example a powder, into the opening 114 of the small measuring flask 111 from the outside, as the opening 114 of the measuring flask is close to the access opening 15 and the orientation of the opening 114 allows a spatula or spoon to be introduced it an oblique angle from above.

Figure 3:
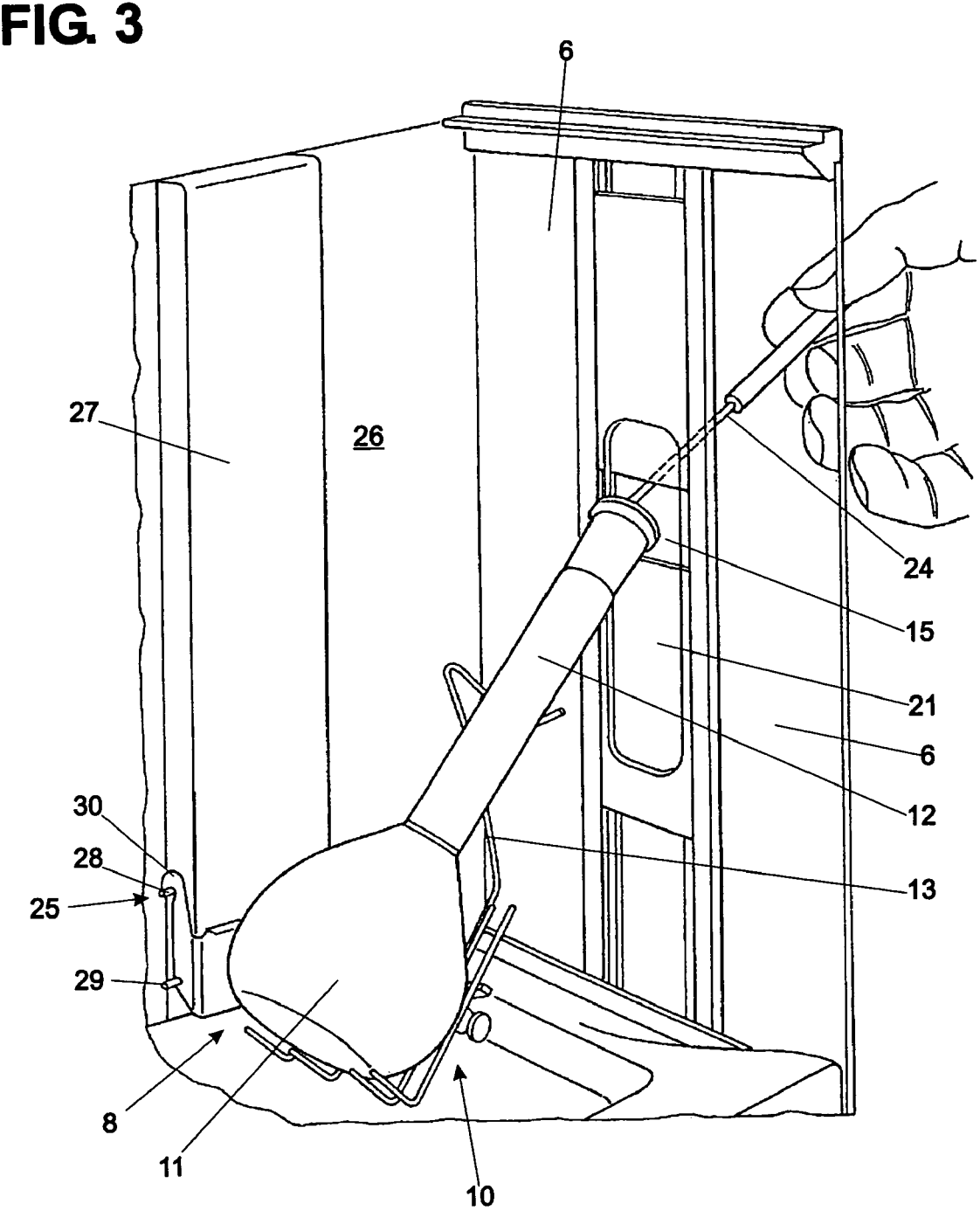
FIG. 3 shows the exemplary balance in perspective in a view from inside the weighing compartment, wherein a user of the balance delivers weighing substance into the measuring flask by means of a spoon.

The filling of a measuring flask 11 is illustrated in FIG. 3, representing a detailed view directed from inside the weighing compartment 3 to the access opening 15 of the sidewall 6. The sidewall 6 has an elongated cutout 21 which extends approximately over the middle one-third of the height of the sidewall 6 and thus provides a range of possible access openings 15. This makes it easy for the user of the balance 1 to deliver the weighing substance by means of a spoon 24 at an oblique angle from above through the access opening 15 into the orifice opening 14 of the neck 12 of the measuring flask 11. In this process, the hand of the user remains completely outside the weighing compartment 3, and the spilling of weighing material inside the weighing compartment 3 is largely avoided. Furthermore, the air temperature in the weighing compartment 3 cannot be raised by the operator's hand and the risk of air drafts is reduced considerably in comparison to the procedure where a measuring flask 11 placed on the weighing object receiver setup 10 of the weighing object carrier 8 is filled while the sidewall 6 is completely opened up. As a consequence, the conditions in the weighing compartment 3 can stabilize very quickly after the access opening 15 has been closed by means of the slides 17, 18, and the weighing result can be displayed in a stable and firm manner.

FIG. 3 shows at least in part how the weighing object carrier 8 is suspended on the coupling arrangement 25 which is located near the rear wall 26. The coupling arrangement 25 of the weighing object carrier 8 is located in the lower part of a column-like projection 27 of the rear wall 26. The coupling arrangement 25 has holder bolts 28 which are connected to a cantilevered extension of the weighing cell (arranged behind the rear wall 26 and therefore invisible) and which protrude through both flanks of the projection 27, where hook-shaped arms 30 of the weighing object carrier 8 can be suspended. A further holder bolt 29 serves as a resting point for the weighing object carrier 8. This coupling arrangement is described in detail in U.S. Pat. No. 6,557,391 B2 and will therefore not be covered in further detail here.

Figure 4:
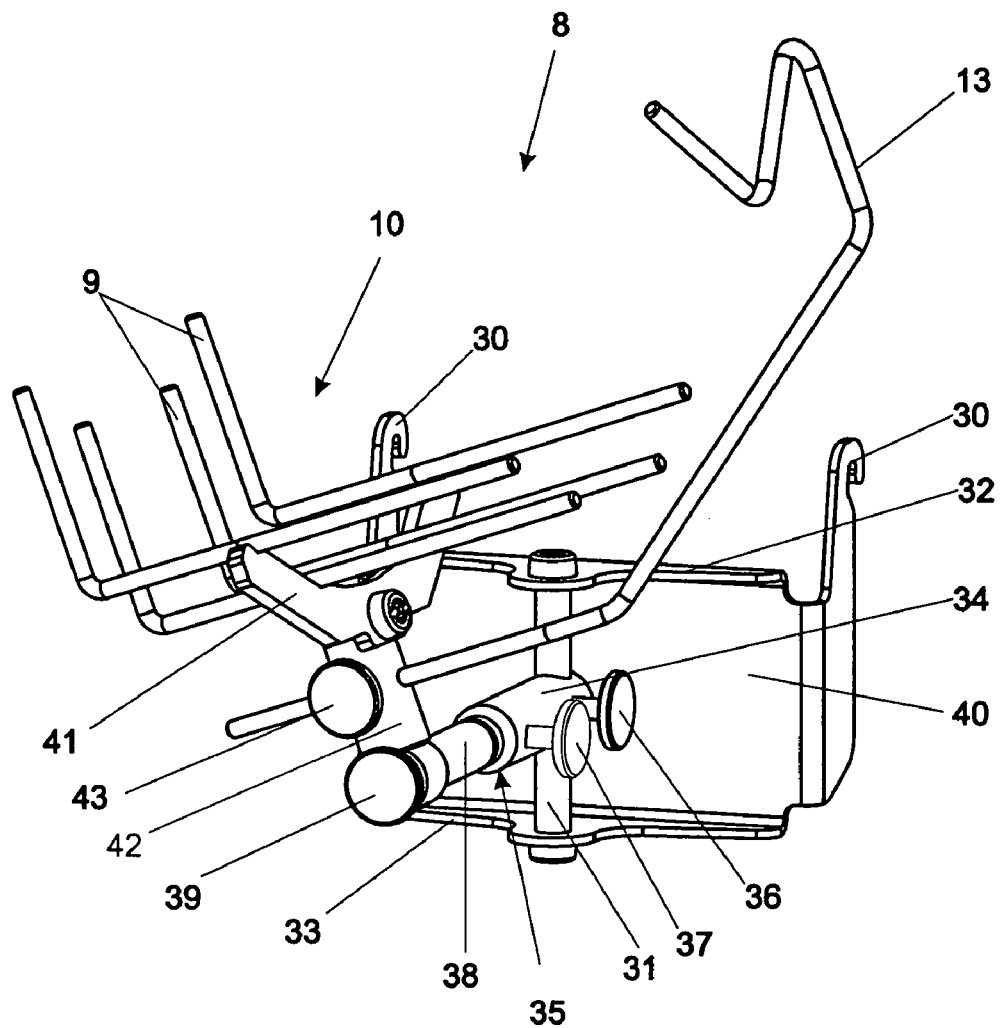
FIG. 4 gives a perspective view of an exemplary weighing object carrier with a weighing object receiver setup to which a holder device for elongated receptacles is fastened.

FIG. 4 gives a perspective view of a weighing object carrier 8. The hook-shaped arms 30 of the coupling element 25 are connected to each other through a connector portion 40 which may be of a rectangular shape. Midway in the connector portion 40, a rod 31 is held in place between an upper and a lower fastening lug 32 and 33, respectively, wherein the rod 31 is oriented vertically when the balance is set up in its operating position. The rod 31 passes with a small amount of play through a bore hole of the sleeve 34 of a pullout extension holder device 35 which can be deployed along its axis. The bore hole is perpendicular to the longitudinal axis of the sleeve 34, so that the pullout extension holder device 35 can be moved up and down along the rod 31 and also rotated about the rod 31. The pullout extension holder device 35 is locked in place by a first locking screw 36 which enters the sleeve 34 from its circumference at a right angle to the rod 31 and clamps the rod 31 into place in the sleeve 34. Thus, the position of the weighing object receiver setup 10 in the weighing compartment 3 is height-adjustable by means of a translatory movement and/or swivel-adjustable by means of a rotary movement about the longitudinal axis of the rod 31.

The pullout extension holder device 35 has an extension rod 38 which can slide into or out of the sleeve 34 and at whose opposite end from the rod 31 the weighing object receiver setup 10 can be fastened. A second clamping screw 37 which is arranged parallel to the clamping screw 36 serves to lock the extension rod 38 in the sleeve 34. With the second clamping screw 37, the position of the weighing object receiver setup 10 within the weighing compartment 3 can be adjusted by means of a translatory displacement in an orthogonal direction to the rear wall 26. With the simultaneous possibility of a rotation about the longitudinal axis of the rod 31, the weighing object carrier 8 can be positioned in a horizontal plane. Furthermore, the position of the weighing object receiver setup 10 within the weighing compartment 3 can be adjusted by means of a rotary movement about the longitudinal axis of the pullout extension holder 35.

The pullout extension holder 35 represents a connecting element between the rod 31 and the weighing object receiver setup 10. The latter can be fastened to the end of the extension rod 38 that faces away from the coupling arrangement 25. The weighing object receiver setup 10 is rotatably mounted on the extension rod 38 which can be locked in a fixed position by a third clamping screw 39.

The weighing object receiver setup 10 is configured in the shape of a grate with grate bars 9 that run parallel to each other and are angled at 90°. The grate bars 9 thus form a receiving seat for a measuring flask 11, 111 (not shown here) which can rest with its circumferential surface on the grate. To prevent the weighing receptacle from sliding out of place, the individual grate bars 9 can be encased with a ring or a sleeve of a polymer material (not shown here). As an equivalent measure, the grate bars 9 could also be at least partially coated with a polymer material, preferably of an electrically conductive kind. On the side of the grate that faces away from the seating area, the grate bars 9 are fastened to an arc-shaped base 41. The arc-shaped base 41 is joined to the pull-out extension holder 35 through a cylinder-shaped holder 42.

By loosening the second clamping screw 37, the weighing object receiver setup 10 can be rotated together with the extension rod 38 about the axis of the latter, so that the seating area of the grate bars 9 is slightly inclined relative to the horizontal position. In other words, the 90°-angled end of the grate bars 9 lies lower than the straight end. Thus, a weighing receptacle can be put in place on the weighing object receiver setup 10 without the risk of tipping over. To accommodate elongated weighing receptacles, there is a holder device in the form of a holder arm 13 which passes through the cylinder-shaped holder 42 and is locked in place by means of a fourth clamping screw 43. If the latter is loosened, the holder arm 13 can be slid back and forth as well as rotated in the cylinder-shaped holder 42, or it can be removed if it is not needed. The support of the weighing receptacle is thereby optimized according to where its center of gravity is located.

With a rotation about the axis which extends along the rod 31, the weighing object receiver setup 10 can be brought into almost any desired position in the lower part of the weighing compartment 3, in particular by making use of the extendibility of the extension rod 37 of the pullout extension holder 35 and further making use of the height-adjustability along the rod 31.

FIG. 5 shows an alternative embodiment of a closure element. Arranged on a slide 117 which is movably constrained in a pair of guide tracks 16 is an iris shutter 44 which serves to close an aperture in the slide 117. By moving the slide 117, the iris shutter can be repositioned to any desired place of the cutout 21 that is covered by the slide in the sidewall 6. As a result, the access opening 115 is variable with regard to its size and position.

It is considered self-evident that other closure elements could be used which are not described in detail herein. For example, lamellar devices can be used which can be rolled or unrolled at their ends, similar to a roll-up curtain. Also the guiding devices for changing the position of a closure element need not necessarily be vertically oriented; horizontally arranged guiding devices, although less advantageous, can likewise be used with, for example, the cutout in the sidewall oriented horizontally. Also to be mentioned in this context is the possibility of a motorized opening and closing of the access opening.

Of course, the arrangement of an access opening with a closure element for closing the access opening is not limited to one sidewall 6. It is possible to arrange additional and/or alternative access openings with closure elements in the opposite sidewall 6 or even in the front wall 5 of the draft shield. Depending on whether the process of filling a weighing receptacle is performed with the left or right hand, the weighing object receiver setup with the weighing receptacle can be turned into the appropriate position, i.e., pointing towards the right or left sidewall 6 or even towards the front wall 5, so that the opening of the weighing receptacle is placed close to the access opening.

It is not required for the balance to have a square-cornered draft shield. A device for creating an access opening with a closure element as described above can also be realized with a triangular, hexagonal, or octagonal draft shield with sidewalls that are either vertical or inclined at an angle relative to the vertical direction. The scope of the present invention also includes in particular balances with a draft shield that has cylindrical sidewalls or other suitable shapes.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 1 balance
2 draft shield
3 weighing compartment
4 balance housing
5 front wall
6 sidewall
7 top wall panel
8 weighing object carrier
9 grate bars
10 weighing object receiver setup
11, 111 measuring flask
12 neck
13 holder arm, holder device
14, 114 opening of the measuring flask
15, 115 access opening
16 pair of guide tracks
17, 117 slide
18 slide
19 grip handle
20 grip handle
21 cutout
22 foot
23 grip handle
24 spoon
25 coupling arrangement
26 rear wall
27 projection
28 holder bolt
29 holder bolt
30 arms of the weighing object carrier
31 rod
32 upper fastening lug
33 lower fastening lug
34 sleeve
35 pullout extension holder device
36 first clamping screw
37 second clamping screw
38 extension rod
39 third clamping screw
40 connecting portion
41 arcuate base 42 cylinder-shaped holder
43 fourth clamping screw
44 iris shutter
45 slide handle

The invention claimed is:

1. Balance comprising:
a weighing compartment;
a draft shield that surrounds the weighing compartment and has at least one sidewall configured to be slidable to allow the draft shield to be opened and closed;
an access opening in the sidewall; and
a closure element serving to close off the access opening, wherein a size and/or position of the access opening in the sidewall can be varied by movement of the closure element, and wherein the closure element is arranged on the outside of the sidewall.

2. Balance according to claim 1, comprising:
a rear wall;
a coupling arrangement reaching through passage openings in the rear wall of the weighing compartment; and
a weighing object carrier which is removably attached to the coupling arrangement.

3. Balance according to claim 2, wherein the weighing object carrier has a weighing object receiver setup as well as a position-adjusting device, wherein the weighing object receiver setup is configured to allow translatory displacement within the weighing compartment relative to a position of the coupling arrangement by means of the position-adjusting device of the weighing object carrier and to allow fixation of the weighing object receiver setup in the displaced position.

4. Balance according to claim 3, wherein an orientation and location of the weighing object receiver setup in the weighing compartment in relation to a position of the coupling arrangement are adjustable through a translatory displacement and a rotation by means of the position-adjusting device of the weighing object carrier.

5. Balance according to claim 4, comprising:
an adjustable holder device for elongated weighing receptacles and configured for attachment to the weighing object receiver setup.

6. Balance according to claim 5, wherein the weighing object receiver setup is configured such that a weighing receptacle with a fill opening can be placed on the weighing object receiver setup with the weighing receptacle inclined at an oblique angle relative to a vertical direction and with a fill opening immediately next to the access opening without touching the sidewall, so that when the closure element is open, there is a direct access through the access opening to the fill opening.

7. Balance according to claim 1, wherein the closure element has two slides configured for one-dimensional movement in a pair of guide tracks.

8. Balance according to claim 1, wherein the closure element has an iris shutter arranged on a sliding panel that is movable one-dimensionally in a pair of guide tracks, wherein the sliding panel has an opening in the area of the iris shutter.

9. Balance according to claim 1, wherein the closure element is driven by a motor to close the access opening.

10. Balance according to claim 1, comprising:
a rear wall;
a coupling arrangement reaching through passage openings in the rear wall of the weighing compartment; and
a weighing object carrier which is removably attached to the coupling arrangement.

11. Balance according to claim 6, wherein the closure element has two slides configured for one-dimensional movement in a pair of guide tracks.

12. Balance according to claim 6, wherein the closure element has an iris shutter arranged on a sliding panel that is movable one-dimensionally in a pair of guide tracks, wherein the sliding panel has an opening in the area of the iris shutter.

13. Balance according to claim 11, wherein the closure element is driven by a motor to close the access opening.

14. Balance according to claim 12, wherein the closure element is driven by a motor to close the access opening.

15. Balance comprising:
a weighing compartment;
a draft shield that surrounds the weighing compartment and has at least one sidewall configured to be slidable to allow the draft shield to be opened and closed;
an access opening embedded in the sidewall; and
a closure element serving to close off the access opening, wherein a size and/or position of the access opening in the sidewall can be varied by movement of the closure element.

16. Balance according to claim 15, wherein the closure element is arranged on the outside of the sidewall.

17. Balance according to claim 15, comprising:
a rear wall;
a coupling arrangement reaching through passage openings in the rear wall of the weighing compartment; and
a weighing object carrier which is removably attached to the coupling arrangement.

18. Balance according to claim 17, wherein the weighing object carrier has a weighing object receiver setup as well as a position-adjusting device, wherein the weighing object receiver setup is configured to allow translatory displacement within the weighing compartment relative to a position of the coupling arrangement by means of the position-adjusting device of the weighing object carrier and to allow fixation of the weighing object receiver setup in the displaced position.

19. Balance according to claim 15, wherein the closure element has two slides configured for one-dimensional movement in a pair of guide tracks.

20. Balance according to claim 15, wherein the closure element has an iris shutter arranged on a sliding panel that is movable one-dimensionally in a pair of guide tracks, wherein the sliding panel has an opening in the area of the iris shutter.

21. Balance according to claim 15, wherein the closure element is driven by a motor to close the access opening.

* * * * *